(12) United States Patent
Alsina et al.

(10) Patent No.: US 11,017,444 B2
(45) Date of Patent: May 25, 2021

(54) VERIFIED-PARTY CONTENT

(71) Applicant: Apple Inc., Cupertino, CA (US)

(72) Inventors: Thomas Alsina, Mountain View, CA (US); Arvind S. Shenoy, San Jose, CA (US); Matthew J. Laine, San Jose, CA (US); Zachary T. Friedland, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1093 days.

(21) Appl. No.: 14/871,807

(22) Filed: Sep. 30, 2015

(65) Prior Publication Data

US 2016/0300280 A1 Oct. 13, 2016

Related U.S. Application Data

(60) Provisional application No. 62/146,800, filed on Apr. 13, 2015.

(51) Int. Cl.
| | |
|---|---|
| *G06Q 30/00* | (2012.01) |
| *G06Q 30/06* | (2012.01) |
| *G06F 21/62* | (2013.01) |
| *H04N 21/2743* | (2011.01) |
| *H04N 21/258* | (2011.01) |
| *G06F 21/10* | (2013.01) |
| *H04N 21/00* | (2011.01) |

(52) U.S. Cl.
CPC ......... *G06Q 30/0609* (2013.01); *G06F 21/10* (2013.01); *G06F 21/6218* (2013.01); *G06Q 30/0625* (2013.01); *G06Q 30/0631* (2013.01); *G06Q 30/0641* (2013.01); *H04N 21/00* (2013.01); *H04N 21/25875* (2013.01); *H04N 21/2743* (2013.01)

(58) Field of Classification Search
CPC ........................ G06Q 30/0609; G06Q 30/0625
USPC ....................................... 705/26.35
See application file for complete search history.

(56) References Cited

U.S. PATENT DOCUMENTS

| | | | |
|---|---|---|---|
| 2003/0159566 A1* | 8/2003 | Sater ..................... | G10H 1/0058 84/615 |
| 2007/0245882 A1* | 10/2007 | Odenwald ............ | G11B 27/034 84/609 |
| 2010/0174608 A1* | 7/2010 | Harkness ................ | G06F 21/10 705/14.53 |
| 2011/0208616 A1 | 8/2011 | Gorman et al. | |
| 2014/0041054 A1 | 2/2014 | Yalcinalp et al. | |
| 2014/0074964 A1 | 3/2014 | Cortes et al. | |
| 2014/0082534 A1* | 3/2014 | Cleron .................... | G06F 3/048 715/764 |
| 2015/0100570 A1* | 4/2015 | Zent ...................... | G06F 16/334 707/723 |
| 2016/0005105 A1 | 1/2016 | Phenner et al. | |
| 2016/0260176 A1* | 9/2016 | Bernard ................ | G06Q 40/12 |

\* cited by examiner

*Primary Examiner* — Mila Airapetian
(74) *Attorney, Agent, or Firm* — Blank Rome LLP

(57) ABSTRACT

Disclosed herein are systems, methods, and non-transitory computer-readable storage media for uploading, by a verified party, verified-party content to a media platform, receiving requests by a client device for store content, and displaying the uploaded verified-party content along with store content on the client device.

26 Claims, 18 Drawing Sheets

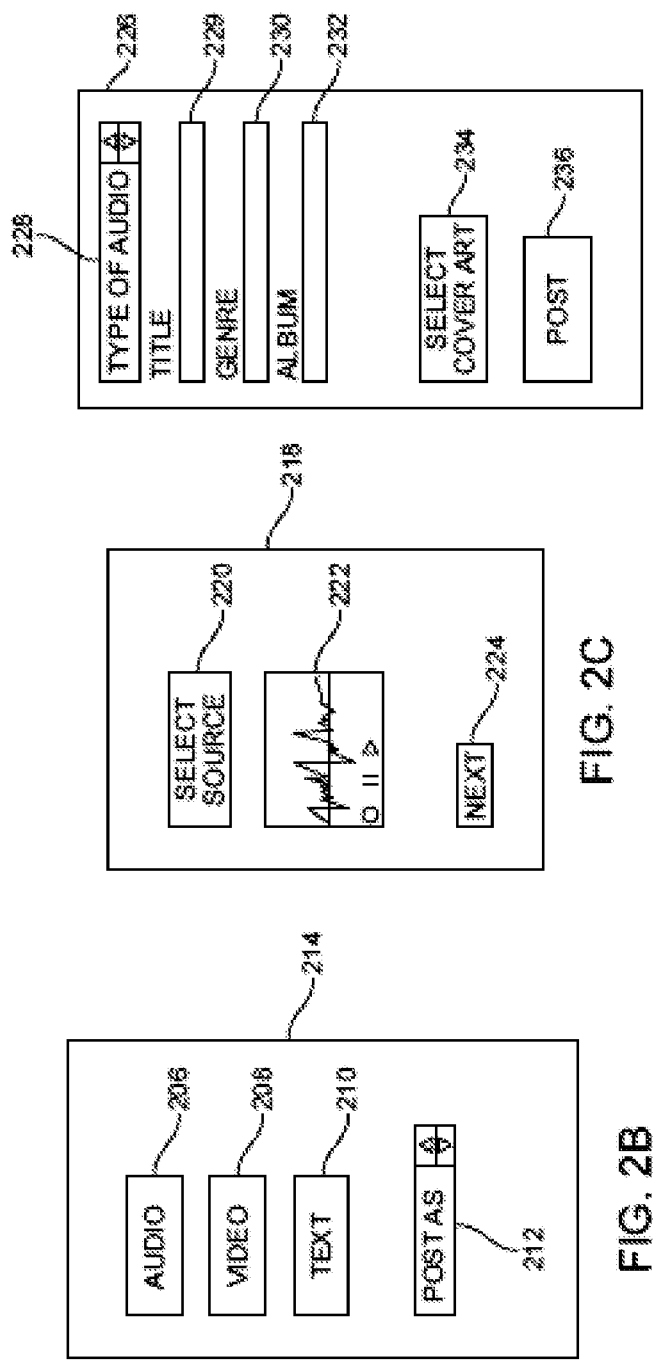

1072

1074 — AUTHENTICATING A VERIFIED PARTY

1076 — ACTIVATING A VERIFIED PARTY CONTENT UPLOAD TOOL ON A CLIENT DEVICE ASSOCIATED WITH THE VERIFIED PARTY

1078 — RECEIVING, THROUGH THE UPLOAD TOOL, A REQUEST TO ADD VERIFIED-PARTY CONTENT TO THE ONLINE STORE

1080 — RECEIVING THE VERIFIED PARTY CONTENT

1082 — TRANSCODING THE VERIFIED PARTY CONTENT

1084 — ASSIGNING THE VERIFIED-PARTY CONTENT A GLOBALLY UNIQUE IDENTIFIER

1086 — ASSOCIATING THE VERIFIED-PARTY CONTENT WITH AN ARTIST IDENTIFIER

1088 — ASSOCIATING THE VERIFIED-PARTY CONTENT WITH A VERIFIED-PARTY CONTENT ACCESS RESTRICTION

FIG. 10C

VERIFIED-PARTY CONTENT

CROSS REFERENCE TO RELATED APPLICATIONS

This application claims priority to U.S. provisional application No. 62/146,800, filed on Apr. 13, 2015, which is expressly incorporated by reference herein in its entirety.

TECHNICAL FIELD

The present disclosure relates to displaying content from a verified party and more specifically to displaying content from a verified party along with store content.

BACKGROUND

Artists have the ability to sell digital media items online and the ability to connect with fans through various media outlets. However, there is no current solution for allowing artists to reach out to fans with non-store content through the same store interface that is used to allow the fans to acquire the artist's content. Additionally, there is no current solution that allows an artist to post non-store content for the artist's fans and later convert the content into store content that can be acquired by fans and added to the fans' media libraries.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for displaying verified-party content along with store content.

A media platform application can be used by a verified party to upload verified-party content to a media platform and used to display the uploaded verified-party content while displaying as store content. The media platform application can be unlocked to perform uploading functionality when a verified party authenticates himself with the application. A verified party can be a party verified by the media platform or a delegate of another verified party.

In response to a client device requesting store content from a media platform, the client device can receive store content for an artist and verified-party content for the artist, display the store content for the artist in a first portion of a display, and display the verified-party content for the artist in a second portion of a display.

The present technology can also involve a media platform receiving a request to upload verified-party content from a verified party, determining that an audio fingerprint of the verified-party content matches known content associated with the verified party, generating a verified-party content access identifier for the verified-party content, and mapping the verified-party content access identifier to an artist identifier for store content. After ingesting the verified-party content, the media platform can transcode the verified-party content into a number of formats for delivery to a plurality of client devices.

Verified-party content can be displayed in a variety of interface configurations include an artist page, a personal media library interface, a 'Now Playing' page, a lockscreen, a content aggregation interface, an album page, etc. Verified-party content can be added to a personal music library. Likewise, a verified party can choose to add uploaded verified-party content to an album of store content.

In some embodiments of the present technology, an artist requests to upload verified-party content and later requests that the verified-party content be converted into store content that can be downloaded or otherwise added to a user library. In some cases, when the media distribution platform receives a request to add verified-party content and authenticates the requesting party, the verified-party content can be assigned a globally unique identifier for locating the verified-party content in the online store, an artist identifier, and a content access restriction that is different than a content access restriction for store content. After the verified-party content is published in the online store an artist can request that the verified-party content be converted to a store content item. In response to the request, the media distribution platform can substitute the verified-party content access restriction with a content access restriction that is associated with that media type. The media distribution platform can also publish a link for locating the converted verified-party content in the online store using the globally unique identifier assigned to the verified-party content when it was ingested into the media distribution platform.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 2B, an interface can be displayed that includes links for specifying a type of content that they want to upload according to some embodiments of the present technology;

FIG. 2C illustrates an interface for selecting a source of existing audio content and tool for recording new audio content according to some embodiments of the present technology;

FIG. 2D illustrates an interface for specifying information about verified-party content according to some embodiments of the present technology;

FIG. 10C illustrates a method of activating a verified party content upload tool and ingesting verified party content using the upload tool according to some embodiments of the present technology;

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

A media platform application can display store content that is available for users to download, stream, purchase, or otherwise consume. The present disclosure addresses the need in the art for parties to have the ability to upload other content to a media platform to be displayed along with store content.

The present technology involves authenticating a party as a verified party that has the authority to post content and displaying the verified-party content in a graphical user interface (GUI) while displaying the store content. Verified-party content can include text, audio, video, etc. For example, a musician can upload text comments, photos, commentary about his music, messages to fans, tour news, new songs, alternate versions of songs (e.g., demo versions or live versions), music videos, merchandise giveaway offers, promotions, etc. and the uploaded content can be displayed along with the musician's other store content.

Verified-party content can be displayed along with store content in a variety of ways. For example, verified-party content can be displayed in an artist page, an album page, a personal media library interface, a content aggregation interface, an interface separate from the media platform application interface, etc.

Figure 1A:
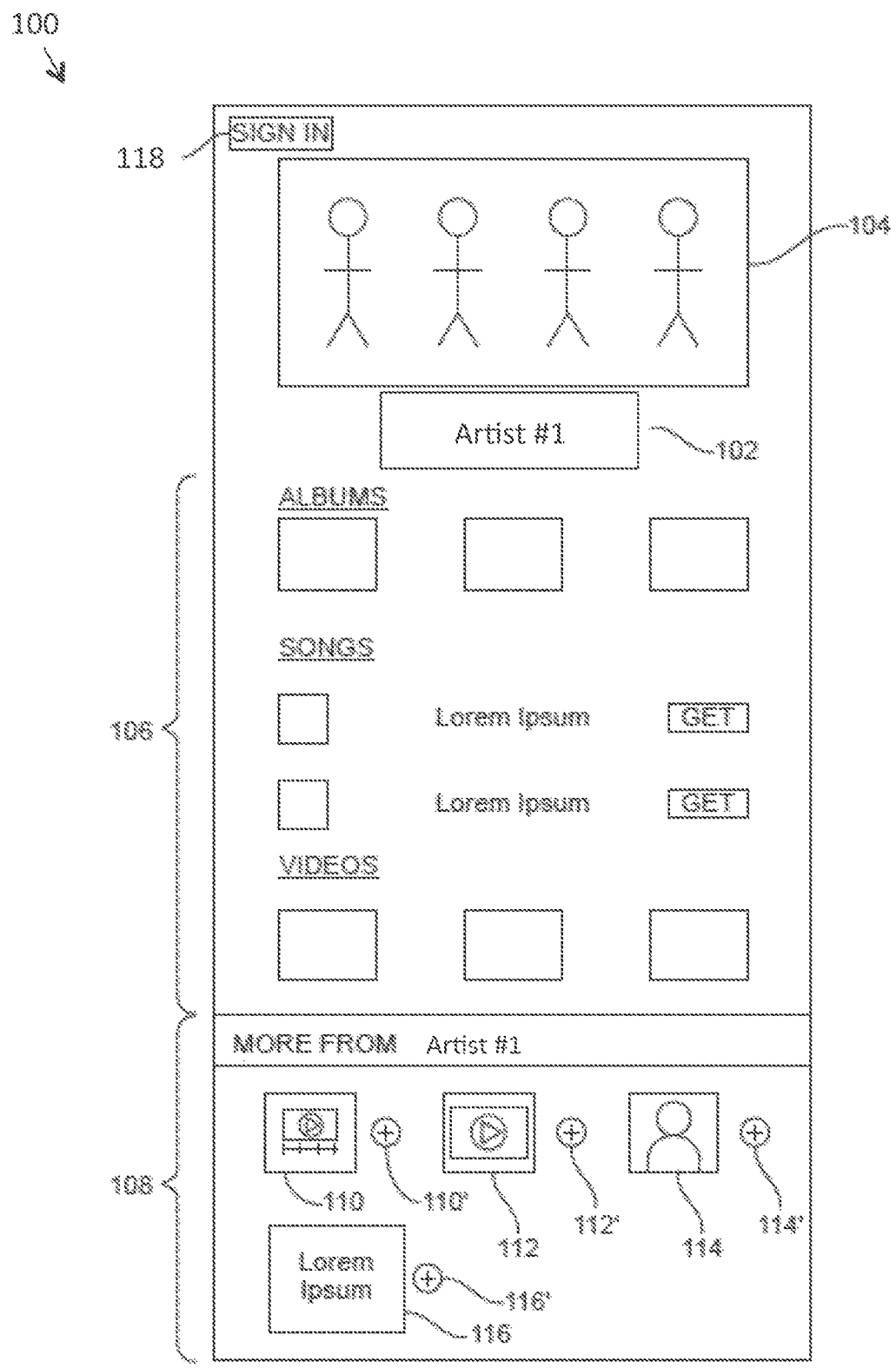
FIG. 1A illustrates an artist page displayed in graphical user interface in a media platform application according to some embodiments of the present technology.

FIG. 1A illustrates an artist page 100 that is displayed in graphical user interface (GUI) in a media platform application according to some embodiments of the present technology. An artist can be an individual artist, a group of artists, etc. The artist page 100 can display the name 102 of the artist, a picture 104 of the artist, and store content 106 available for the artist. For example, the store content 106 can include albums, songs, movies, videos, television shows, books, podcasts, etc.

Additionally, the artist page 100 can display verified-party content 108. For example, the artist page 100 can display a video 110 of a back stage interview with an artist, an audio track 112 featuring a live version of a song, a photo 114 of an artist, a text-based message 116 from an member of a band, etc. The artist page 100 can also include buttons 110', 112', 114', 116' for adding the verified-party content 108 to a media library associated with an account viewing the artist page 100, as explained in greater detail below.

The media platform application can be used to access verified-party content as well as be used by a verified party to upload verified-party content. In some embodiments of the present technology, the media platform application unlocks the uploading functionality after a verified party authenticates himself with the application. For example, the artist page 100 can include a link 118 for authenticating a verified party and initiating a process of a verified party uploading verified-party content, a media platform ingesting the verified-party content, and the media platform providing the verified-content to other devices along with store content.

Figure 1B:
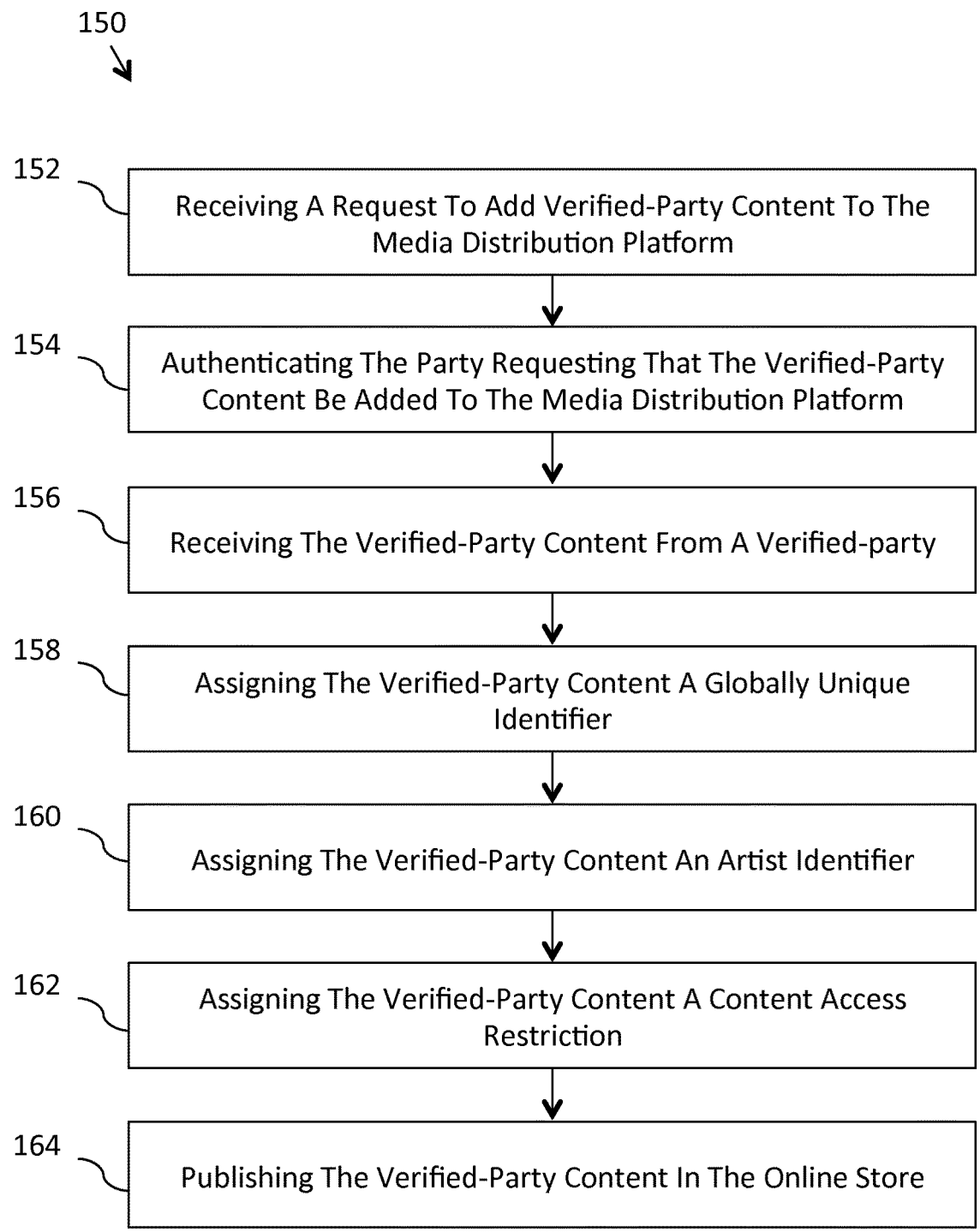
FIG. 1B illustrates a method of ingesting verified-party content into a media distribution platform according to some embodiments of the present technology.

FIG. 1B illustrates a method 150 of ingesting verified-party content into a media distribution platform according to some embodiments of the present technology. The method 150 involves receiving a request to add verified-party content to the media distribution platform 152. Next, the method involves authenticating that the party requesting that the verified-party content be added to the media distribution platform is received from a verified party 154. For example, authenticating a party can involve confirming that a login credential is associated with an artist or a pre-authorized delegate of the artist.

After the requesting party is verified, the method 150 can involve the media distribution platform receiving the verified-party content from a verified-party 156, assigning the verified-party content a globally unique identifier for locating the verified-party content in the online store 158, assigning the verified-party content an artist identifier for the artist 160, and assigning the verified-party content a content access restriction 162.

In some embodiments, the content access restriction assigned to the verified-party content is different than a content access restriction (e.g. digital rights management (DRM) restrictions) for store content. For example, a music item in an online store can have a DRM restriction that requires that a user purchase a decryption key to download, stream, or otherwise access the music item. On the other hand, a verified-party content item in the form of artist-uploaded music video can have a content access restriction that allows a user to watch the video by streaming it through an online store interface, but that does not allow a user to download the video or otherwise obtain the video as part of their media library.

The method 150 also involves publishing the verified-party content in the online store 164. The verified-party content can be published in a variety of ways as explained below in greater detail. Also, the verified-party content is published according to the content access restriction. For example, the verified-party content can be displayed in the online store for streaming consumption without having a link for users to purchase, download for free, rent, or otherwise obtain the verified-party content as part of their media library.

Figure 2A:
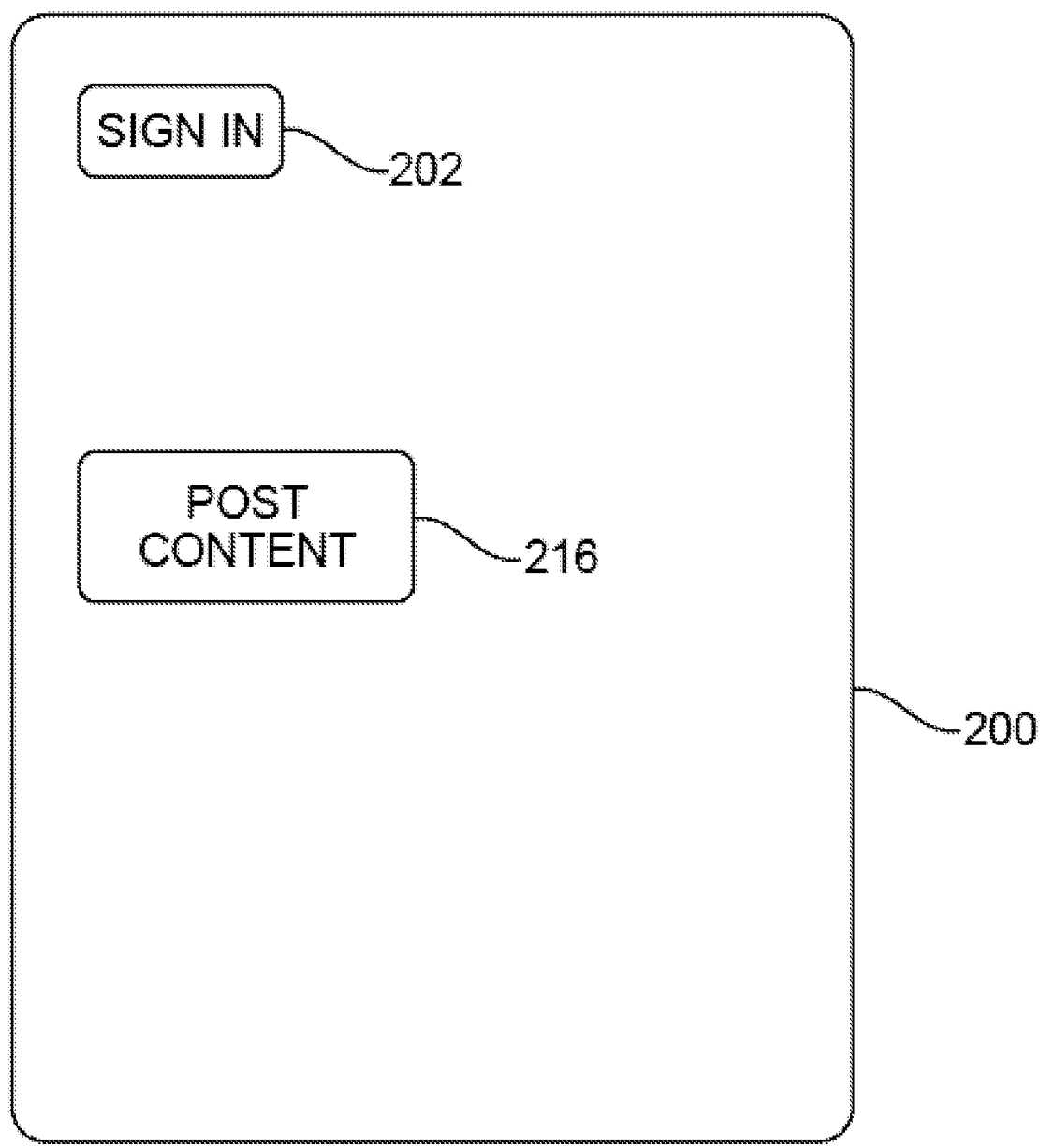
FIG. 2A illustrates an application interface used to upload verified-party content according to some embodiments of the present technology.

FIG. 2A illustrates an application interface 200 that can be used to upload verified-party content. The interface 200 includes a link 202 for authenticating a verified party. In some embodiments, a party is manually verified before receiving access to the communication channel used to upload verified-party content. A verified party can also delegate the ability to upload verified-party content to one or more parties on behalf of the verified party. For example, if a verified party is a musical group, the group can delegate the ability to upload verified-party content to band members, agents, public relations representatives, etc.

After being authenticated the verified party can select a link 216 to access an interface display of uploading verified-party content to the media platform to be displayed along with store content. For example, as shown in FIG. 2B, an interface 214 can be displayed that includes links 206, 208, 210 for specifying a type of content that they want to upload. For example, the interface 214 can include a link 206 for uploading audio content, a link 208 for uploading video content, and a link 210 for uploading text.

In some embodiments, a verified party can be verified to upload verified-party content on behalf of multiple entities. For example, a musician can be verified to upload verified-party content on behalf of himself as a solo artist and on behalf of a band that he is a member of. Likewise, a delegated verified party can receive authorization to upload verified-party content on behalf of more than one other verified party. For example, a public relations firm can receive authorization to upload verified-party content on behalf of many artists. Accordingly, as shown in FIG. 2B, the interface 214 can also include a menu 212 for specifying a verified party for which they would like to upload verified-party content.

Initially, a type of content to be uploaded is selected, and then a series of further interfaces can be presented for the verified party to upload verified-party content. For example, FIGS. 2C-2D illustrate a series of interfaces for uploading audio content. FIG. 2C illustrates an interface 218 with a link 220 for selecting a source of existing audio content (e.g. saved on a device, from a network location, etc.) and tool 222 for recording new audio content. After the audio content is selected or recorded, the verified party can select a link 224 for accessing a further interface 226 for specifying metadata for the selected audio content, as shown in FIG. 2D.

The interface 226 for specifying metadata can include a menu 228 for specifying a type of audio content being uploaded (e.g. song, speech, etc.) and a link 234 for allowing the verified party to select a source of an image (e.g. cover art) to associate with the uploaded content. The interface 226 can also include fields 230, 232 for specifying audio metadata. For example, the interface 226 can display a TITLE metadata field 229 for specifying a title and a GENRE metadata field 230 for specifying content genre. Also, as explained in greater detail below, a verified party can choose to associate a verified-party with an existing album already associated in a media store that is part of the media platform by specifying an album name in an ALBUM metadata field 232. The interface 226 also includes a link 236 for uploading the verified party content to the media platform.

Figure 2E:
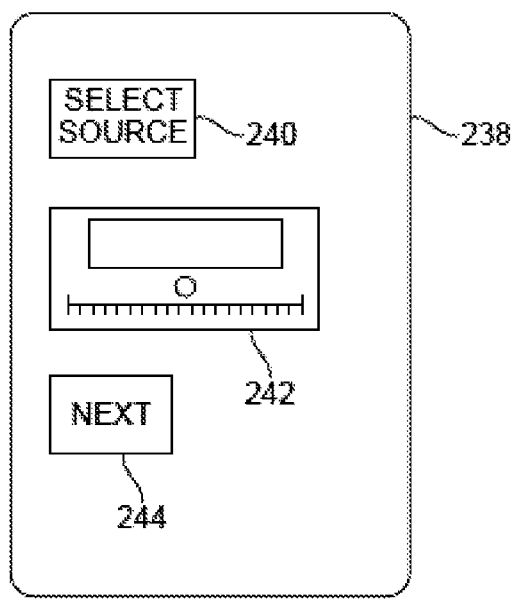
FIG. 2E illustrates an interface for selecting a source of existing video content and tool for recording new video content according to some embodiments of the present technology.
Figure 2F:
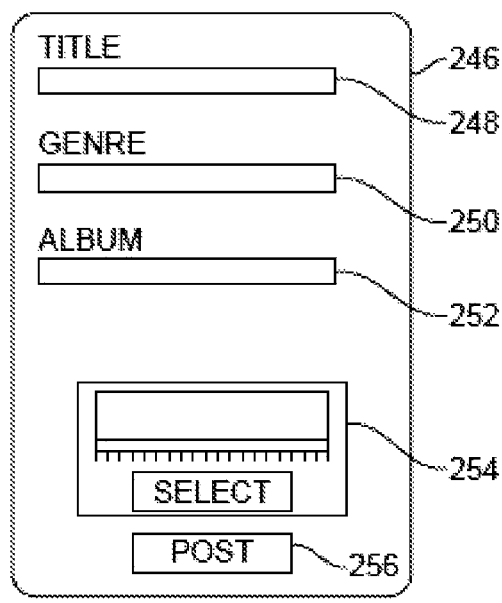
FIG. 2F illustrates an interface for specifying information about verified-party content according to some embodiments of the present technology.

FIGS. 2E-2F illustrate a series of interfaces for uploading video content. FIG. 2E illustrates an interface 238 with a link 240 for selecting a source of existing video content (e.g. saved on a device, from a network location, etc.) and tool 242 for recording new video content, e.g. using a camera on the device running the application, a connected device, etc. After the video content is selected or recorded, the verified party can select a link 244 for accessing a further interface 246 for specifying metadata for the selected audio content, as shown in FIG. 2F.

The interface 246 for specifying metadata can include fields 248, 250, 252 for specifying video metadata. For example, the interface 246 can display a TITLE metadata field 248 for specifying a title, a GENRE metadata field 250 for specifying content genre, and an ALBUM metadata field 252 for identifying an album in a media store with which to associate the uploaded video content. Another tool 254 can be used to select a video frame to be used as an image (e.g. cover art) to associate with the uploaded content. The interface 246 also includes a link 256 for uploading the verified party content to the media platform.

Figure 2G:
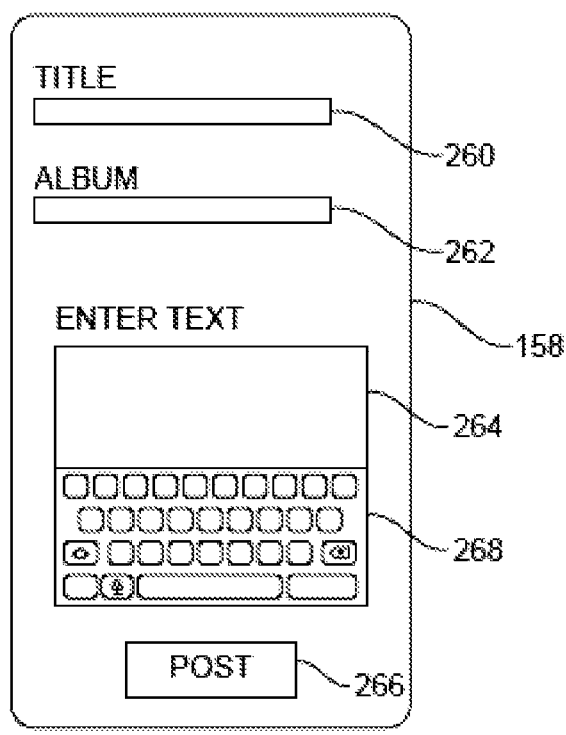
FIG. 2G illustrates an interface for entering text and specifying text content metadata according to some embodiments of the present technology.

FIG. 2G illustrates an interface 258 with fields 260, 262 for specifying text content and text metadata. For example, the interface 258 can display a TITLE metadata field 260 for specifying a title and an ALBUM metadata field 262 for identifying an album in a media store with which to associate the uploaded text content. The interface 258 also includes a text box 264 for displaying entered text and a virtual keyboard 268 for entering text. The interface 258 also includes a link 266 for uploading the verified party content to the media platform.

When a verified party specifies verified-party content, describes the verified-party content (e.g. with metadata), and instructs the media application to upload the verified-party, the media platform can perform an ingestion process and begin delivering the verified-party content to be displayed in a media application along with store content.

Figure 3:
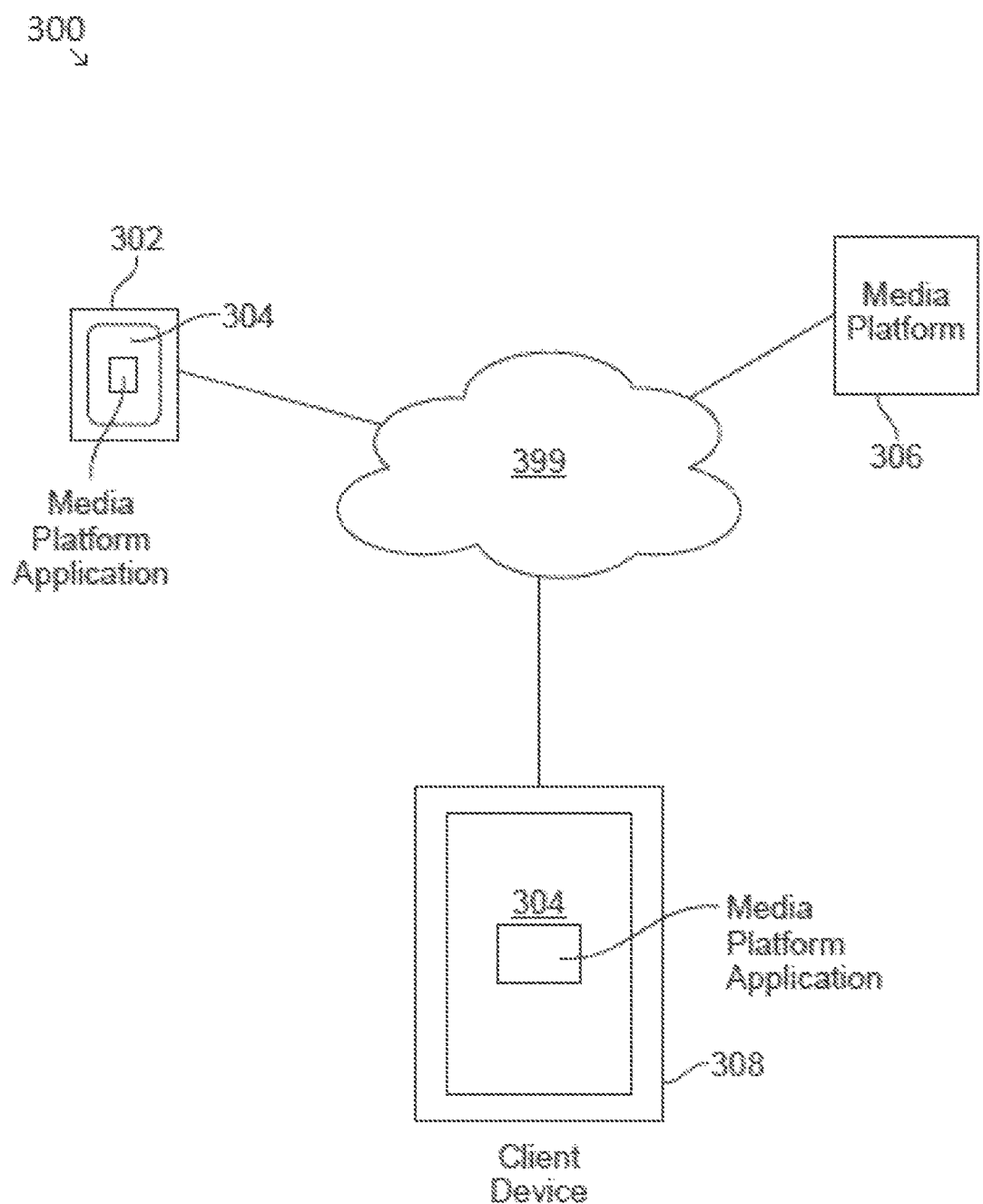
FIG. 3 illustrates an environment for a verified party to upload verified-party content to a media platform and for a client device to request verified-party content from the media platform according to some embodiments of the present technology.

FIG. 3 illustrates an environment 300 for a verified party to upload verified-party content to a media platform and for a client device to request verified-party content from the media platform according to some embodiments of the present technology. The environment 300 can include a verified party device 302, a media platform 306, and a client device 308 in communication via one or more network 399.

The verified party device 302 can include a processor running a media platform application 304. The verified party can use the media platform application 304 to transmit a request to upload verified party content to the media platform 306.

The media platform 306 can include one or more processors to receive the request from the verified party and ingest the verified-party content, as discussed in greater detail below.

Similarly, the client device 308 can also include a processor for running the media platform application 304 to request content from the media platform 306. As explained above, in some embodiments, the media platform application 304 unlocks uploading functionality when a verified party authenticates himself with the application. The client device 308 can receive store content from the media platform 306 and verified-party content and display them together, as described in greater detail below.

Figure 4A:
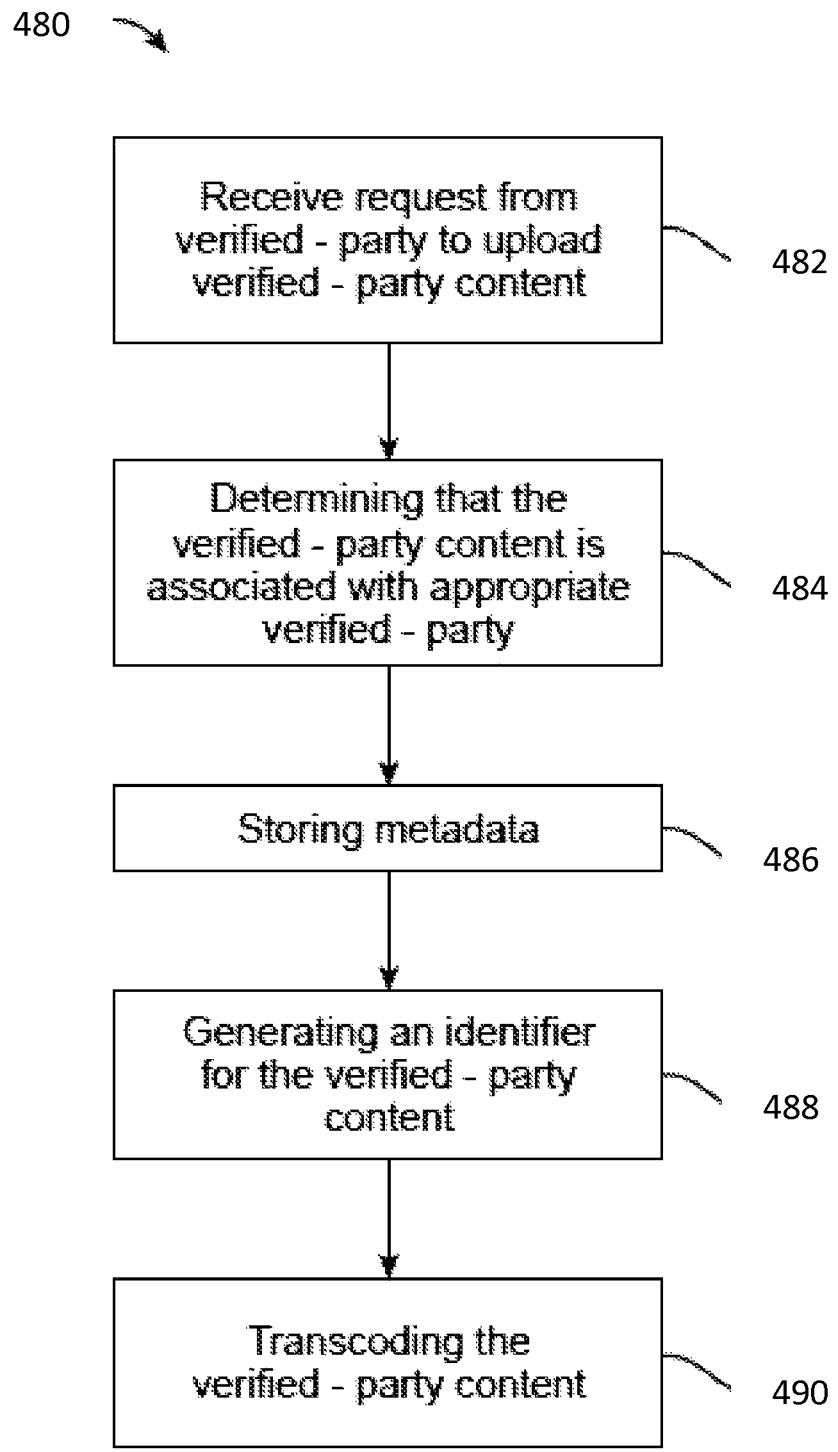
FIG. 4A illustrates a method of ingesting and transcoding verified-party content from a verified party according to some embodiments of the present technology.

FIG. 4A illustrates a method 480 of a media platform ingesting and transcoding verified-party content from a verified party according to some embodiments of the present technology. The method 480 involves receiving a request from a verified party to upload verified-party content 482 to be displayed along with store content.

Next, to ensure that the content is actually from who it is purported to as being from, the method 480 involves determining that the verified-party content is associated with an appropriate verified party 484. For example, the media platform can perform a process of audio fingerprinting an uploaded audio file and compare it to a known audio sample of a party to determine that the uploaded audio is from the same party as the known audio sample.

The method 480 further involves storing the metadata entered by the verified party 486 and generating a verified party content access identifier for the verified-party content 488. The verified party content access identifier can be based on the metadata entered. For example, the verified party content access identifier can be a Universal Resource Locator (URL) that is used to locate the metadata for the verified-party content in a content repository of store content and verified-party content. In some embodiments, the content repository is arranged using artist identifiers and the verified party content access identifier is mapped to artist identifiers to which the verified party is associated with. Mapping the verified party content access identifier to the artist identifier allows the media platform application to discover verified-party content for display for displaying with store content in a media platform application interface.

The method 480 also involves transcoding the content portion of the verified-party content 490. In some cases, verified-party content is transcoded to be readable by a number of different devices and at a number of different quality levels. For example, the verified-party content is transcoded into multiple formats and at multiple bitrates. Additionally, a preview of the verified-party content can be created. Similarly, a number of thumbnail images can be created to represent the verified-party content for a number of device form factors (e.g. watch, vehicle audio interface, smartphone, tablet, laptop, desktop, etc.)

Figure 4B:
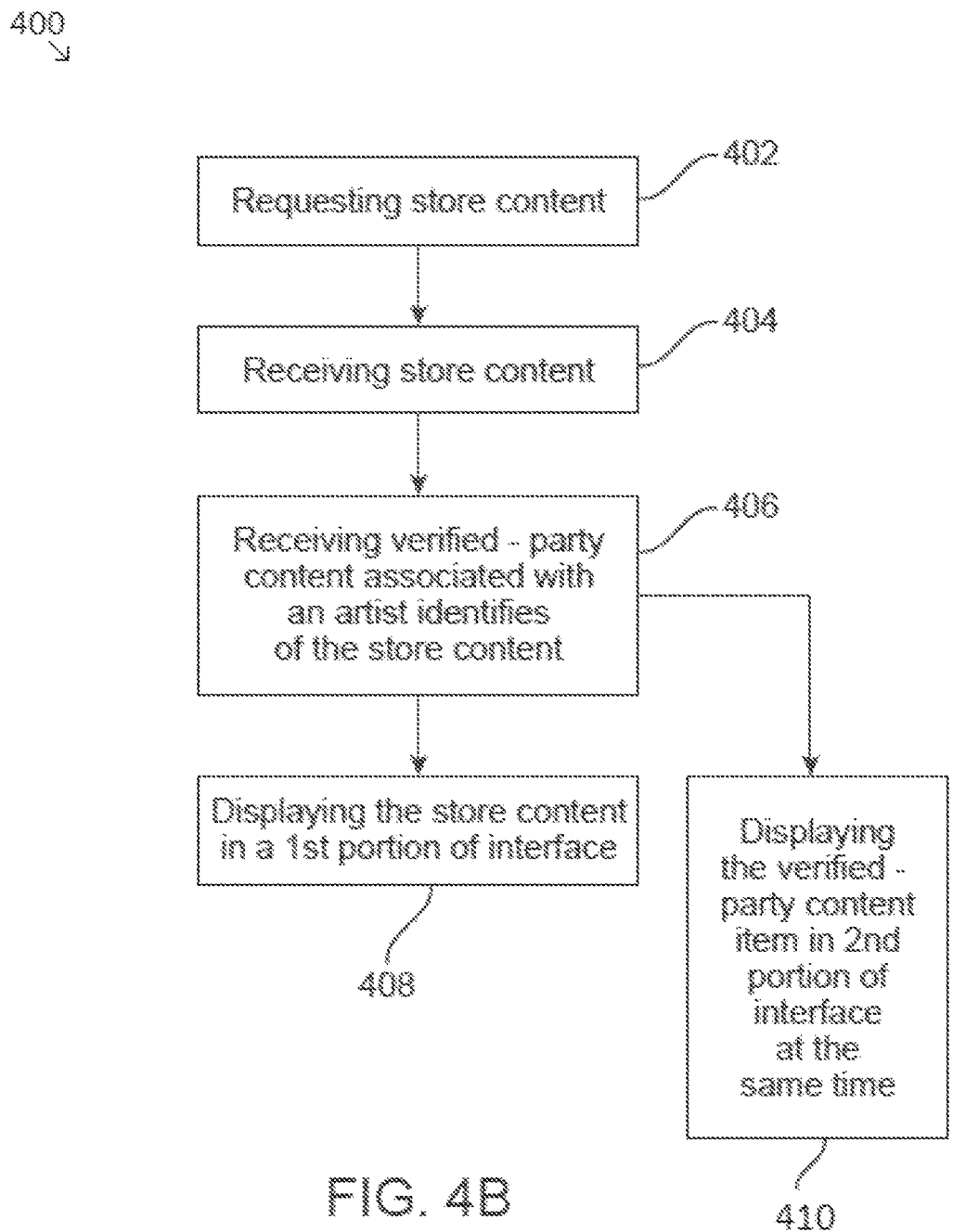
FIG. 4B illustrates a method of displaying verified-party content along with store content according to some embodiments of the present technology.

When the media platform has ingested and transcoded verified-party content it becomes available for a media platform application to request and display the verified-party content along with store content. FIG. 4B illustrates a method 400 of displaying verified-party content along with store content according to some embodiments of the present technology.

The method 400 involves a media platform application requesting store content from a media store 402 that is part of a media platform. For example, an electronic device can receive an input in a media platform application to request the specified media item from the media store. The media store can contain store content and verified-party content for a plurality of artists, each artist being assigned an artist identifier. Based on the request, the method 400 can involve receiving store content 404 from the media platform and receiving verified-party content that is associated with the artist identifier 406 of the store content.

In some embodiments of the present technology, only a portion of a total amount of the verified-party content is delivered along with the store content. For example, the media platform sends verified-party content that was uploaded by the verified party less than a predetermined time period (e.g. less than two days old). Similarly, the media platform can send only the $n^{th}$ most recent verified-party content item from an artist in response to a request from the media platform application—with n being selected by a user, set as a default, etc. In another example, the media store sends the most recent verified-party content item of each content type (e.g. audio, video, text, podcast, etc.).

Next, the method 400 involves displaying the store content in a first portion of a media platform application interface 408 and displaying the verified-party content item that is associated with the artist identifier in second portion of the media platform application interface 410 along with the store content.

As explained above, verified-party content can be displayed in a wide range of ways. In some cases the verified-party content can be displayed subject to verified-party content access restrictions that are separate from the store content's digital rights management (DRM) restrictions. For example, the verified-party content access restrictions can require that the media platform application interface be of a certain type (e.g. artist page only, media streaming service only, etc.) before allowing the verified-party content to be displayed. The verified-party content access restrictions can also involve regional restrictions, explicit content type restrictions, etc.

Referring again to FIG. 1A, a media platform application interface can display an artist page 100 that includes store items 106 available for the artist displayed in one portion of the artist page and verified-party content 108 displayed in a different portion of the artist page. In some cases, the media platform application unlocks uploading functionality when a verified party authenticates himself with the application.

As explained above, in some cases only recent verified-party content is delivered to the media platform application interface. However, the verified-party content 108 can also be viewed in a media library after receiving a request to add the verified-party content to a personal media library, and updating the interface to include the verified-party content in the personal media library and to remove the verified-party content from the other portion of the interface. Also, when the verified-party content is added to a media library, it can be accessed without the recency restrictions placed on other verified-party content that is delivered.

Figure 5:
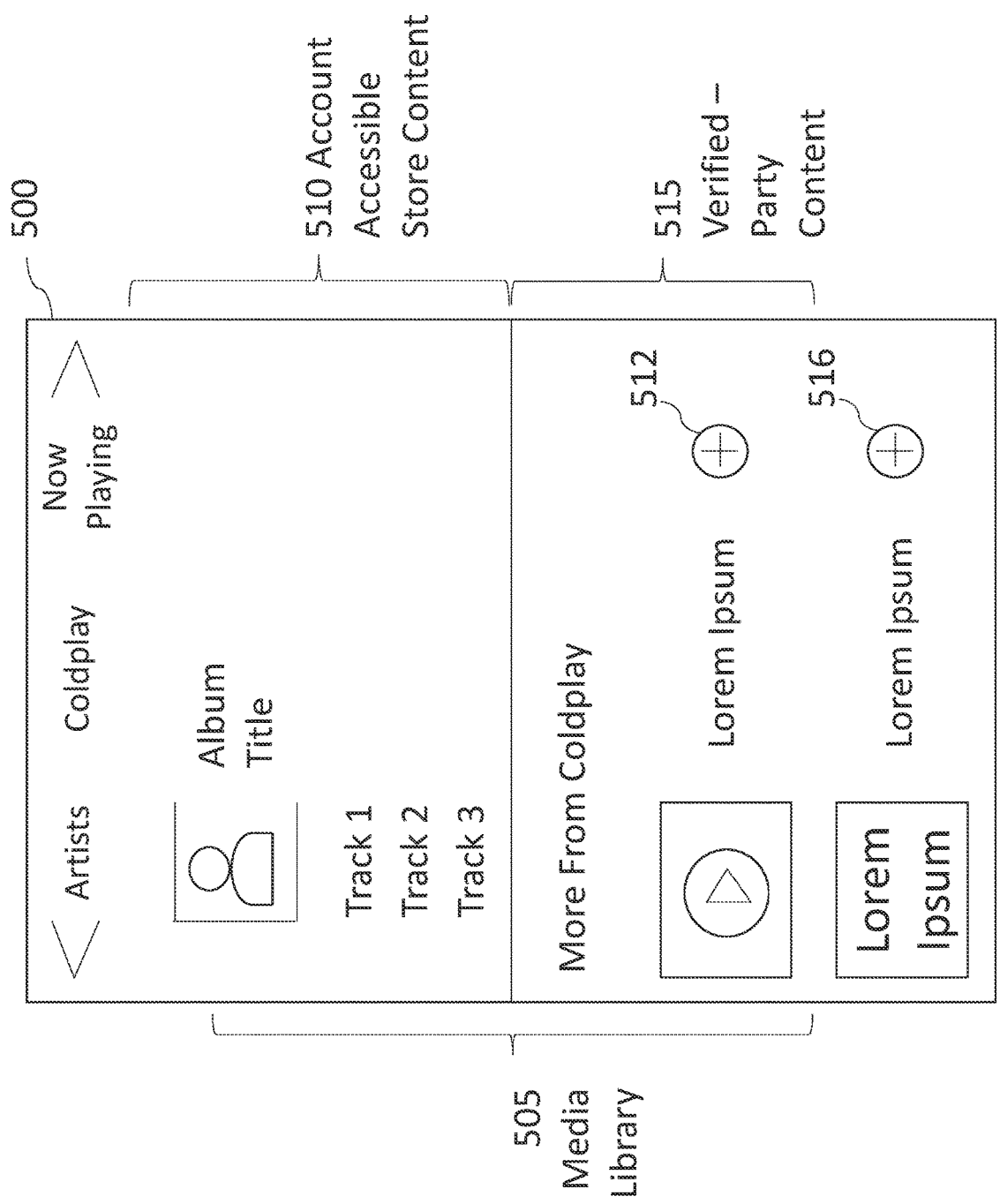
FIG. 5 illustrates an example of a media library interface according to some embodiments of the present technology.

FIG. 5 illustrates an example of a media library interface 500 according to some embodiments of the present technology. The media library interface 500 includes an artist page of a media library 505 including store content accessible by an account associated with the library 510 and verified party content 515 selected by a user (e.g. via buttons 512 and 516) for inclusion in the media library 505. In some embodiments of the present technology, only the latest content uploaded from the verified-party is shown. In some cases, it is shown as a minimal informational bubble over the album artwork and the user can tap the bubble to see the full post/content.

Figure 6:
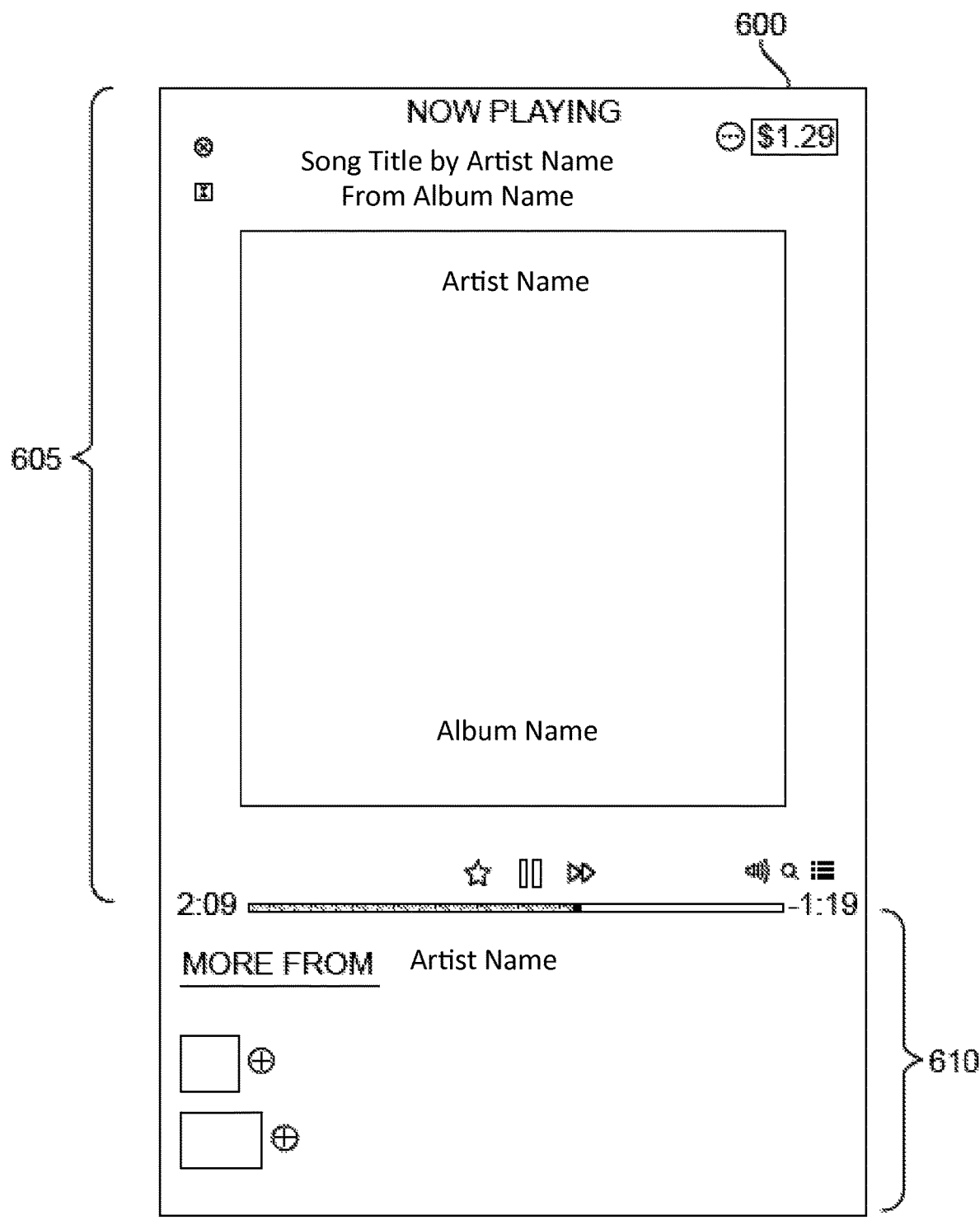
FIG. 6 illustrates an interface displaying currently playing store content along with verified-party content according to some embodiments of the present technology

Additionally, verified-party content can also be displayed in an interface for displaying store items that are currently being presented. For example, FIG. 6 illustrates an interface 600 displaying store content that is currently being presented (i.e. "NOW PLAYING") and verified-party content according to some embodiments of the present technology. The interface 600 displays information about a store content item that is currently being presented (e.g. from an Internet radio stream, a subscription service, etc.) as well as verified-party content 610 from the same artist as the store content item that is currently being presented.

Figure 7:
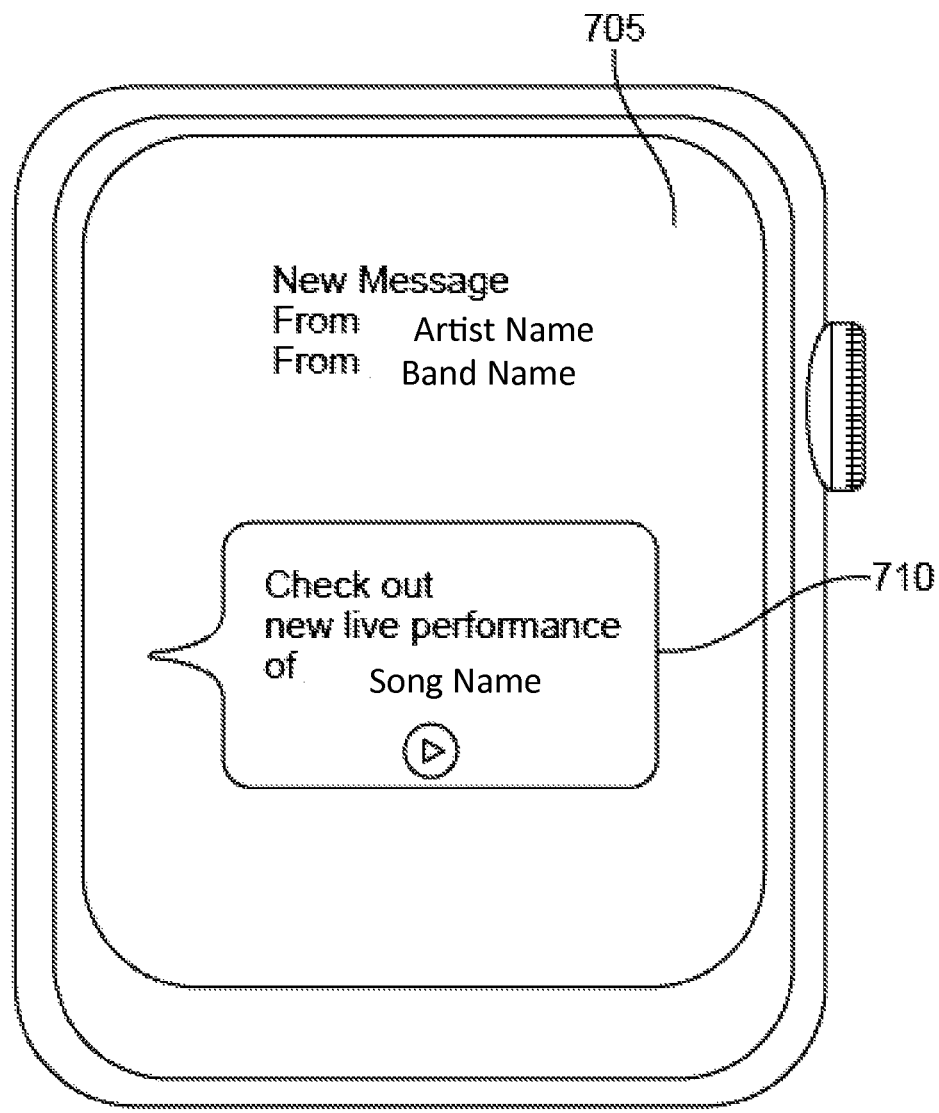
FIG. 7 illustrates a wearable device interface displaying verified-party content on a lockscreen according to some embodiments of the present technology.

Similarly, verified-party content can also be displayed in an interface separate from an interface for displaying store items while those store items currently being played. For example, the verified-party content can be displayed on a lockscreen of device while the device is playing store content. FIG. 7 illustrates a wearable device interface 700 displaying verified-party content 705 on a lockscreen according to some embodiments of the present technology.

Figure 8:
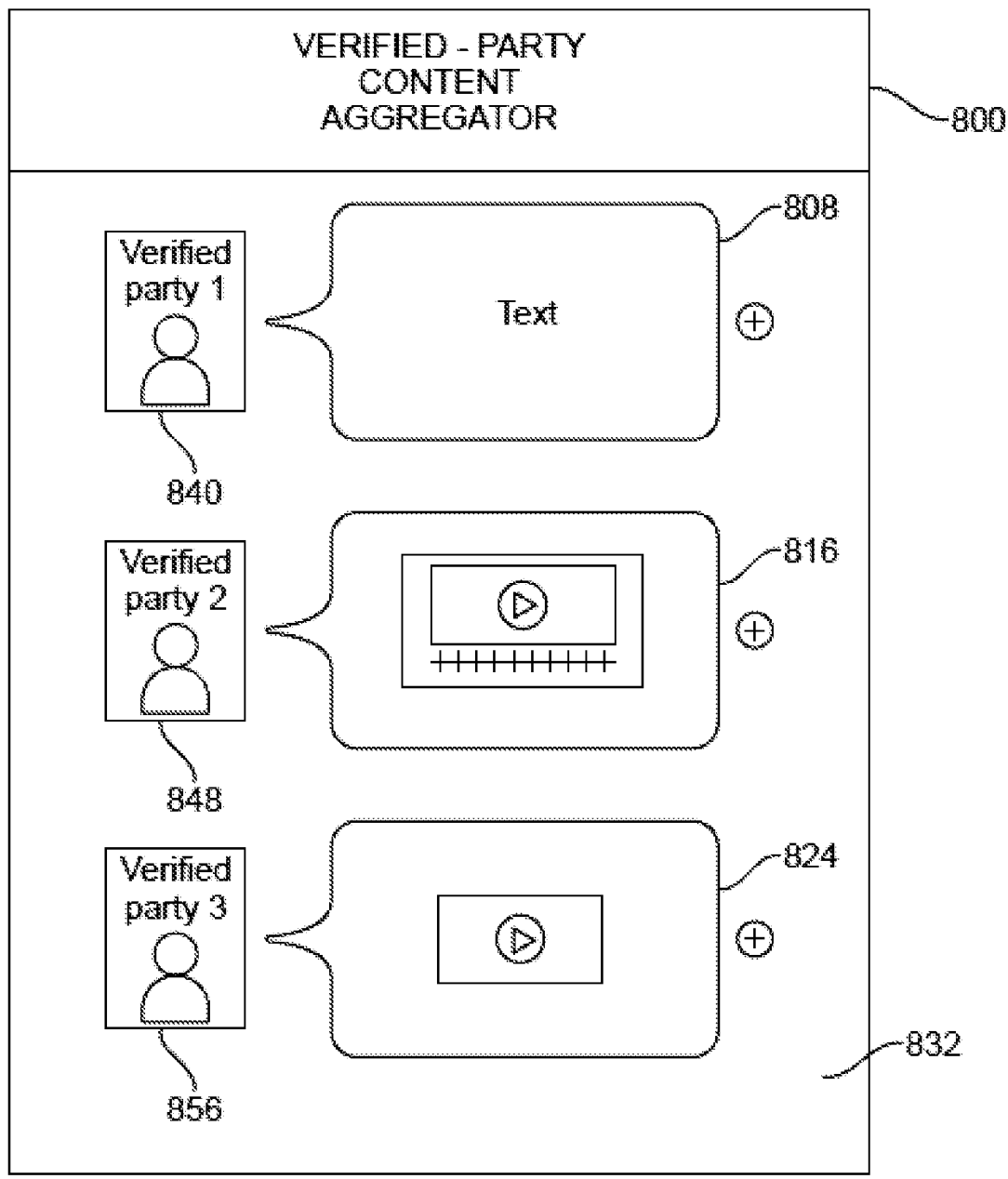
FIG. 8 illustrates a verified-party content aggregator interface according to some embodiments of the present technology.

Verified-party content can also be displayed in verified-party content aggregator that posts verified-party content determined to be of interest to a user of a device associated with a media platform account. FIG. 8 illustrates a verified-party content aggregator interface 800 according to some embodiments of the present technology. The verified-party content aggregator interface 800 can display posts 808, 816, 824 on a wall 832. The verified-party content aggregator can select verified-party content from multiple verified parties. For example, a text post 808 can be from a first verified party 840, a video post 816 can be from a second verified party 848, an audio post 824 can be from a third verified party 856.

Figure 9:
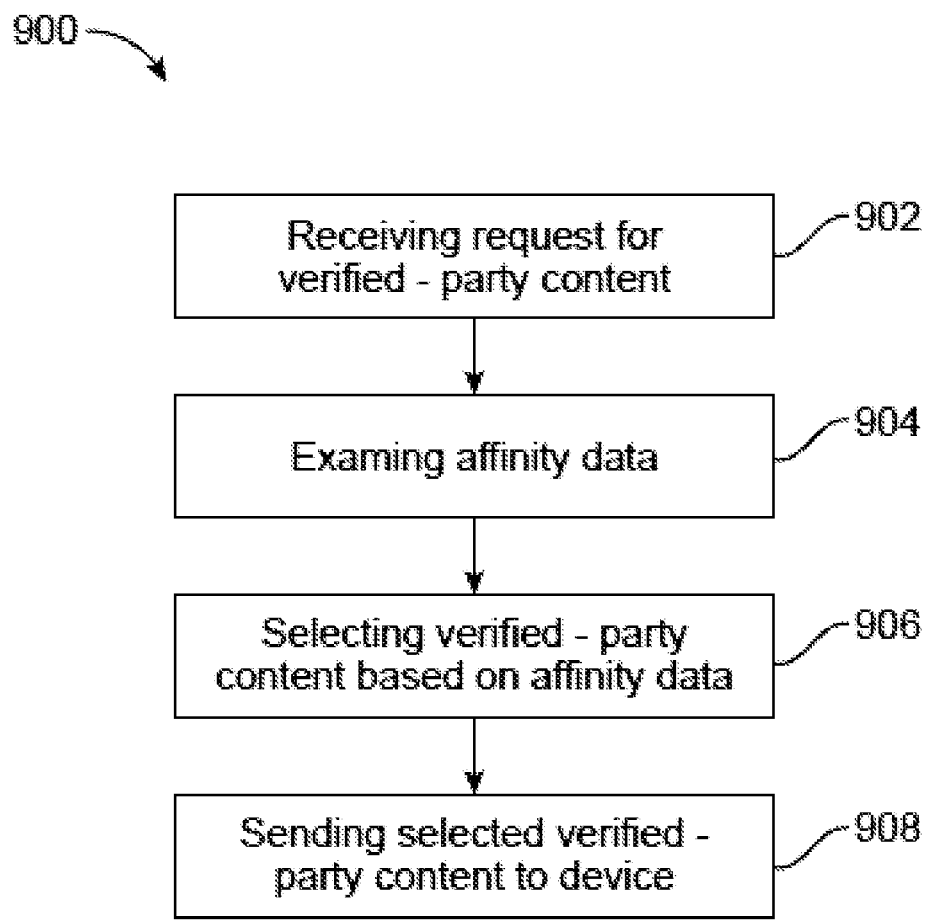
FIG. 9 illustrates a method of delivering verified-party content to a verified-party content aggregation application according to some embodiments of the present technology.

As explained above, a verified-party content aggregator can select verified-party content for display in the interface. FIG. 9 illustrates a method 900 of delivering verified-party content to a verified-party content aggregation application according to some embodiments of the present technology. The method 900 involves a media platform receiving a request for verified-party content from a verified-party content aggregation application on a device 902.

In some embodiments of the present technology, the media platform uses demographic information and affinity data to select verified-party content to deliver to the aggregation application on the device. Demographic information can be provided by a user or inferred by a user's profile. Similarly, affinity data can include data about content a user likes or dislikes. In some cases a user actively rates content, specifies that he likes/dislikes content, "favorites" content, skips content, etc. In some other cases, affinity can be inferred by the other types of content the user consumes.

The media platform can examine demographic and affinity data for an account associated with the device 904 and can select verified-party content based on the affinity data 906. Next, the method 900 involves sending the selected verified-party content to the device 908 for display in the verified-party content aggregation application.

As explained above, verified parties using an application interface, e.g. application interface 200, can upload verified-party content. Additionally, verified parties can use the application interface to add uploaded verified party content to an existing location in the media store. For example, a verified party can bundle uploaded verified-party content into an existing album. For example, a verified party can upload a live version of an audio track and an unreleased demo version of an audio track as verified-party content. The uploaded verified-party content can then be added or associated with the album content as "bonus material".

In a specific example, a verified party can specify album metadata fields (e.g. ALBUM metadata fields 232, 252, 262) during or after an uploading workflow to add the verified-party content to the specified album.

Figure 10A:
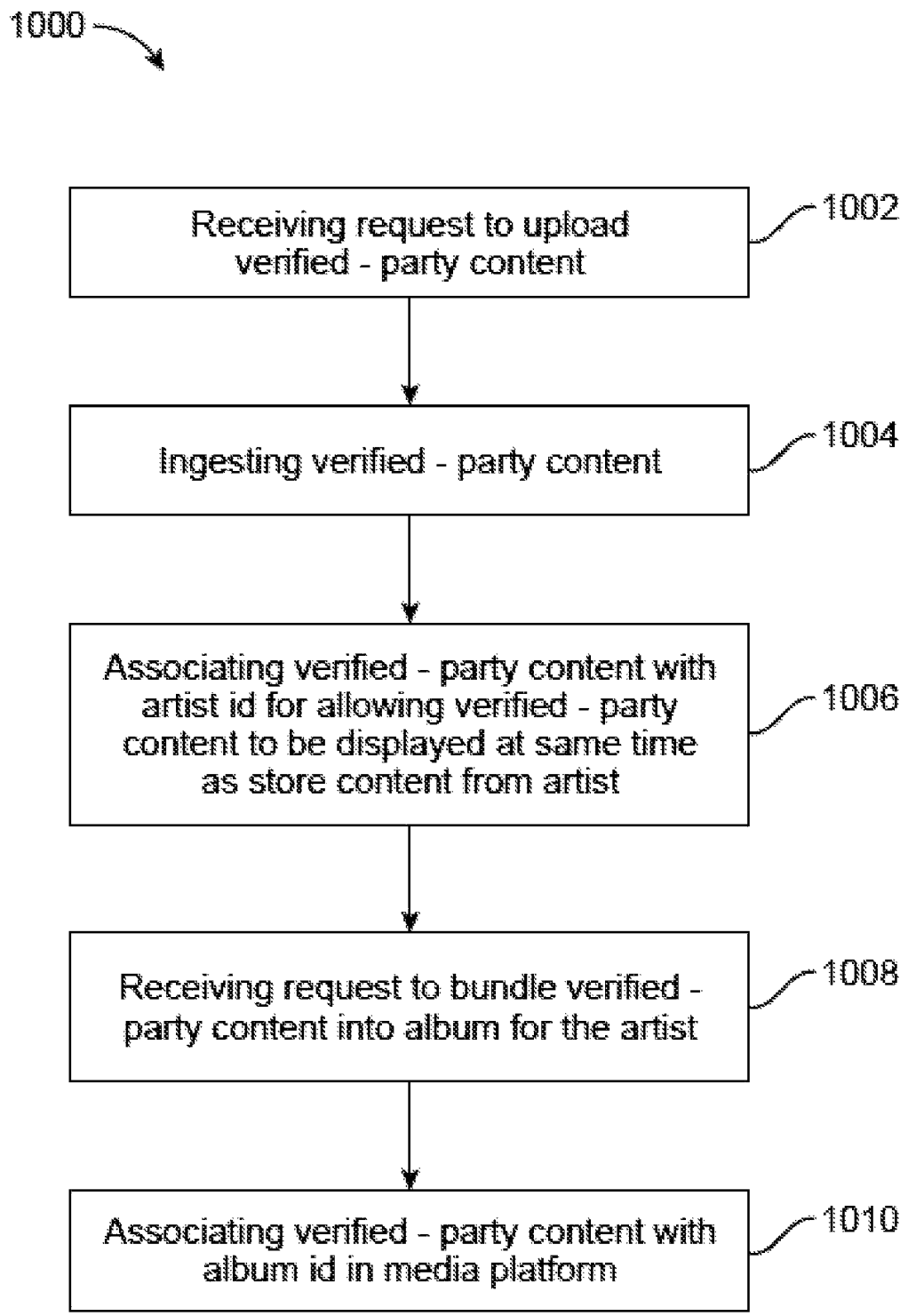
FIG. 10A illustrates a method of bundling verified-party content into album content according to some embodiments of the present technology.

FIG. 10A illustrates a method 1000 of bundling verified-party content into album content according to some embodiments of the present technology. The method 1000 can involve a media platform receiving a request to upload verified-party content 1002. In response, the method 1000 can involve the media platform ingesting the verified-party content 1004 and associating the verified-party content with an artist identifier 1006 for allowing the verified-party content to be displayed along with store content from the same artist.

Next, the method 1000 can involve receiving, from a verified party, a request to bundle verified-party content into an album associated with the artist 1008 and associating verified-party content with the album identifier in the media platform 1010. When the verified-party content is associated with an album identifier, it is displayed as part of the album itself rather than being displayed in a separate portion than the album content items.

Figure 10B:
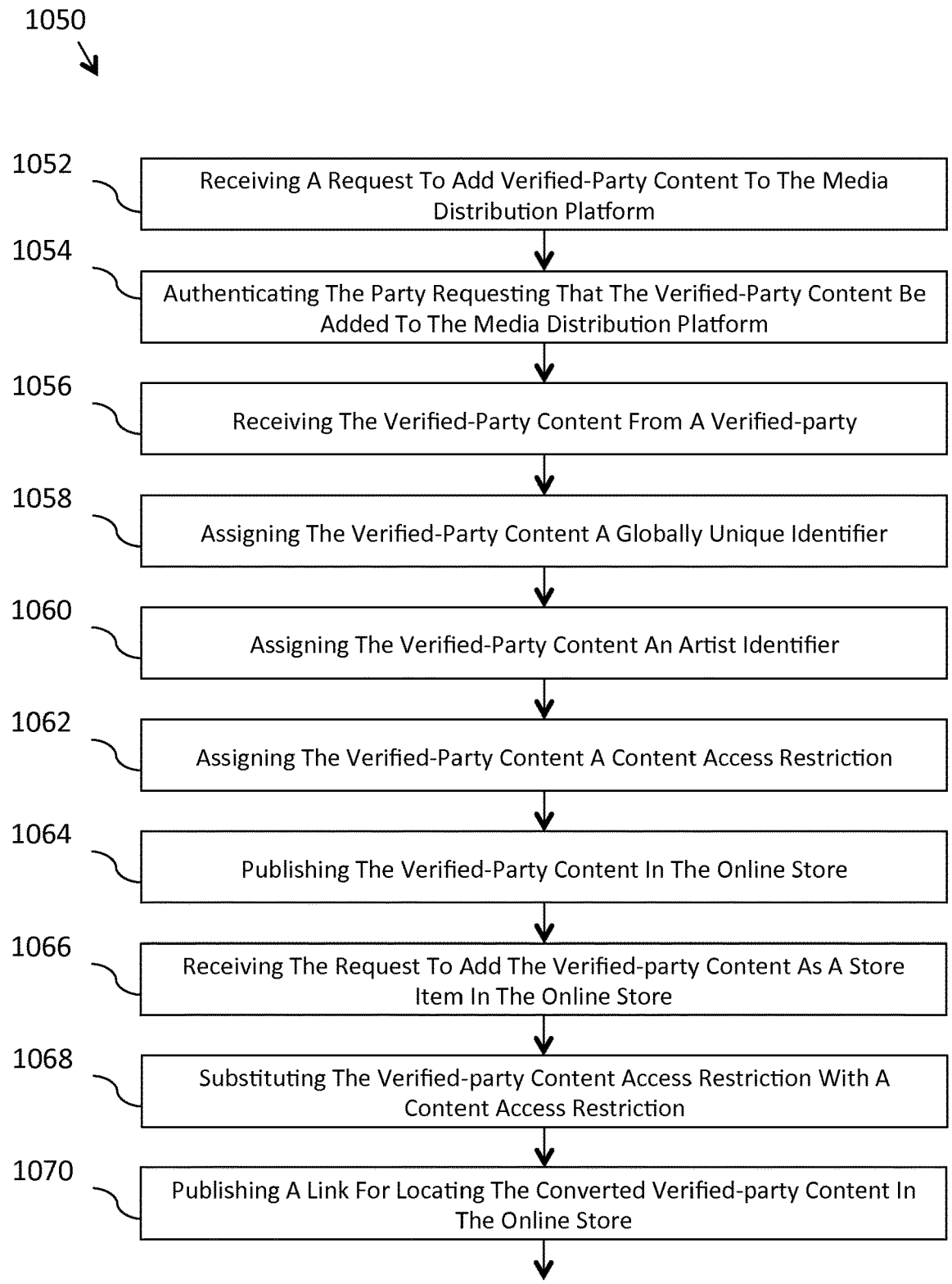
FIG. 10B illustrates a method of receiving verified-party content and converting the verified-party content into store content at the request of an artist according to some embodiments of the present technology.

FIG. 10B illustrates a method 1050 of receiving verified-party content and converting the verified-party content into store content at the request of an artist according to some embodiments of the present technology. The method 1050 involves receiving a request to add verified-party content to the media distribution platform 1052 and authenticating that the party requesting that the verified-party content be added to the media distribution platform is received from a verified party 154. After the requesting party is verified, the method 1050 can involve the media distribution platform receiving the verified-party content from a verified-party 1056, assigning the verified-party content a globally unique identifier for locating the verified-party content in the online store 1058, assigning the verified-party content an artist identifier for the artist 1060, and assigning the verified-party content a content access restriction 1062 that is different than a content access restriction (e.g. digital rights management (DRM) restrictions) for store content.

As explained above, the content access restriction assigned to the verified-party content can be different than a content access restriction (e.g. digital rights management (DRM) restrictions) for store content. For example, a music item in an online store can have a DRM restriction that requires that a user purchase a decryption key to download, stream, or otherwise access the music item. On the other hand, a verified-party content item in the form of artist-uploaded music video can have a content access restriction that allows a user to watch the video by streaming it through an online store interface, but that does not allow a user to download the video or otherwise obtain the video as part of their media library.

Next, the method 1050 also involves publishing the verified-party content in the online store 1064. Subsequently, an artist or an artist's delegate can request that the verified-party content be converted to a store content item. For example, an artist can post a live performance of a song as verified-party content and later decide to add the live performance to a pre-existing album containing the song as bonus material.

The method 1050 can involve receiving the request to add the verified-party content as a store item in the online store 1066 and substituting the verified-party content access restriction with a content access restriction 1068 that is associated with that media type. For example, the media distribution platform can encrypt a the artist-uploaded audio file, generate a DRM decryption key for the artist-uploaded audio file, and allow the DRM key to be purchased in the online store. Finally, the method 1050 involves publishing a link for locating the converted verified-party content in the online store 1070 using the globally unique identifier assigned to the verified-party content when it was ingested into the media distribution platform.

In some embodiments, the artist, or delegate thereof, can specify how converted verified-party content is published in the online store. For example, an artist can chose to add verified-party content to an existing album and provide the converted verified-party content free of charge to users that own the DRM key for the album. In that case, creating a link to obtain the converted verified-party content involves displaying a Download button in an album view of those users. In another example, an artist can chose to add the verified-party to the online store as an independent store item creating a link to obtain the converted verified-party content involves displaying a Purchase button that allows users to purchase the DRM decryption key for accessing the converted verified-party content.

FIG. 10C illustrates a method 1072 of activating a verified party content upload tool on a client device associated with a verified party and ingesting verified party content using the upload tool according to some embodiments of the present technology. The method 1072 involves a media distribution platform authenticating a verified party 1074 as an artist, a member of a group of artists, a delegate, etc. and activating a verified party content upload tool on a client device associated with the verified party 1076. For example, activating the upload tool can involve exposing a link in a client application as described above. Next, the method 1072 can involve receiving, through the upload tool, a request to add verified-party content to the online store 1078, receiving the verified party content 1080, and transcoding the verified party content 1082 for distribution by the online store.

Also, the method 1072 involves assigning the verified-party content a globally unique identifier 1084, associating the verified-party content with an artist identifier 1086 such that the verified-party content is associated with store content items having the same artist identifier, and associating the verified-party content with a verified-party content access restriction 1088 that can be less restrictive than an online store content access restriction associated with the store content items.

Figure 11A:
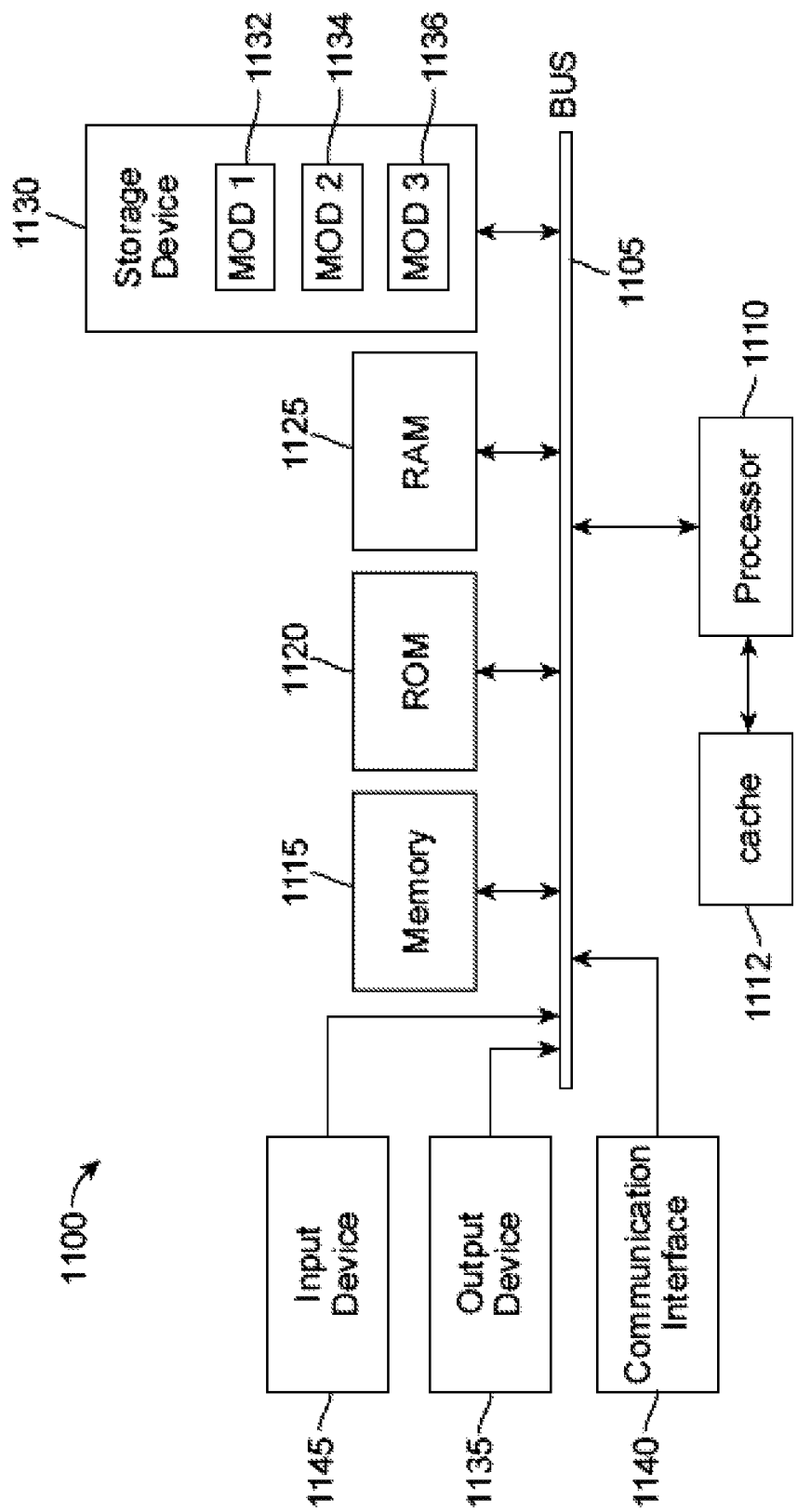
FIG. 11A and FIG. 11B illustrate possible system embodiments.
Figure 11B:
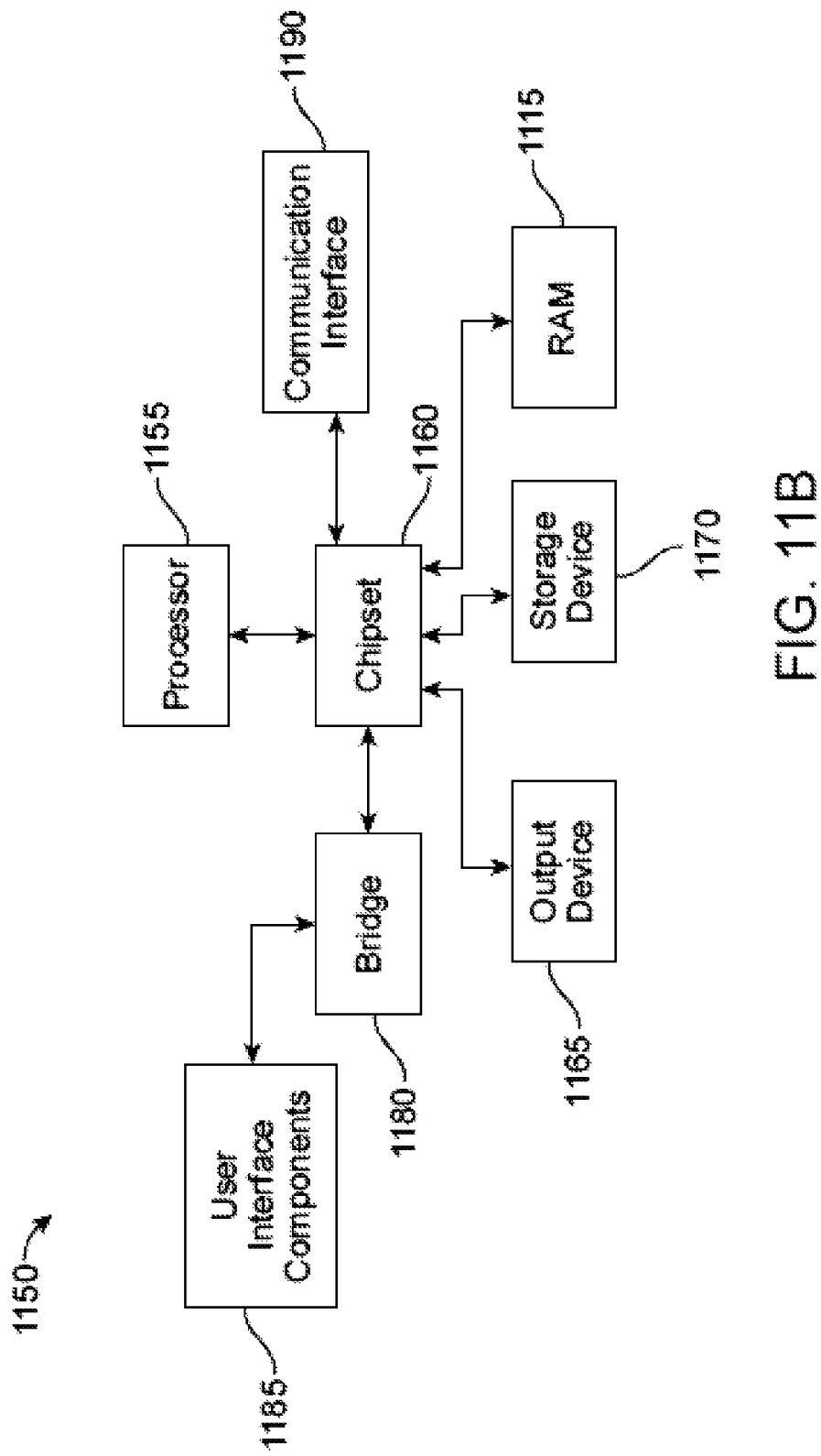

FIG. 11A and FIG. 11B illustrate possible system embodiments. The more appropriate embodiment will be apparent to those of ordinary skill in the art when practicing the present technology. Persons of ordinary skill in the art will also readily appreciate that other system embodiments are possible.

FIG. 11A illustrates a conventional system bus computing system architecture 1100 wherein the components of the system are in electrical communication with each other using a bus 1105. Exemplary system 1100 includes a processing unit (CPU or processor) 1110 and a system bus 1105 that couples various system components including the system memory 1115, such as read only memory (ROM) 1120 and random access memory (RAM) 1125, to the processor 1110. The system 1100 can include a cache of high-speed memory connected directly with, in close proximity to, or integrated as part of the processor 1110. The system 1100 can copy data from the memory 1115 and/or the storage device 1130 to the cache 1112 for quick access by the processor 1110. In this way, the cache can provide a performance boost that avoids processor 1110 delays while waiting for data. These and other modules can control or be configured to control the processor 1110 to perform various actions. Other system memory 1115 may be available for use as well. The memory 1115 can include multiple different types of memory with different performance characteristics. The processor 1110 can include any general purpose processor and a hardware module or software module, such as module 1 1132, module 2 1134, and module 3 1136 stored in storage device 1130, configured to control the processor 1110 as well as a special-purpose processor where software instructions are incorporated into the actual processor design. The processor 1110 may essentially be a completely self-contained computing system, containing multiple cores or processors, a bus, memory controller, cache, etc. A multi-core processor may be symmetric or asymmetric.

To enable user interaction with the computing device 1100, an input device 1145 can represent any number of input mechanisms, such as a microphone for speech, a touch-sensitive screen for gesture or graphical input, keyboard, mouse, motion input, speech and so forth. An output device 1135 can also be one or more of a number of output mechanisms known to those of skill in the art. In some instances, multimodal systems can enable a user to provide multiple types of input to communicate with the computing device 1100. The communications interface 1140 can generally govern and manage the user input and system output. There is no restriction on operating on any particular hardware arrangement and therefore the basic features here may easily be substituted for improved hardware or firmware arrangements as they are developed.

Storage device 1130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1125, read only memory (ROM) 1120, and hybrids thereof.

The storage device 1130 can include software modules 1132, 1134, 1136 for controlling the processor 1110. Other hardware or software modules are contemplated. The storage device 1130 can be connected to the system bus 1105. In one aspect, a hardware module that performs a particular function can include the software component stored in a computer-readable medium in connection with the necessary hardware components, such as the processor 1110, bus 1105, display 1135, and so forth, to carry out the function.

FIG. 11B illustrates a computer system 1150 having a chipset architecture that can be used in executing the described method and generating and displaying a graphical user interface (GUI). Computer system 1150 is an example of computer hardware, software, and firmware that can be used to implement the disclosed technology. System 1150 can include a processor 1155, representative of any number of physically and/or logically distinct resources capable of executing software, firmware, and hardware configured to perform identified computations. Processor 1155 can communicate with a chipset 1160 that can control input to and output from processor 1155. In this example, chipset 1160 outputs information to output 1165, such as a display, and can read and write information to storage device 1170, which can include magnetic media, and solid state media, for example. Chipset 1160 can also read data from and write data to RAM 1175. A bridge 1180 for interfacing with a variety of user interface components 1185 can be provided for interfacing with chipset 1160. Such user interface components 1185 can include a keyboard, a microphone, touch detection and processing circuitry, a pointing device, such as a mouse, and so on. In general, inputs to system 1150 can come from any of a variety of sources, machine generated and/or human generated.

Chipset 1160 can also interface with one or more communication interfaces 1190 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1155 analyzing data stored in storage 1170 or 1175. Further, the machine can receive inputs from a user via user interface components 1185 and execute appropriate functions, such as browsing functions by interpreting these inputs using processor 1155.

It can be appreciated that exemplary systems 1100 and 1150 can have more than one processor 1110 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method comprising:
    requesting from an online store a store content item, the online store having a plurality of store content items from a plurality of artists, each artist being assigned an artist identifier;
    displaying the store content item in a first portion of a graphical user interface on a device, the store content item being associated with a first artist;
    receiving verified party content and an indication that the verified party content is from a verified party, wherein the verified party is verified by the online store to be a party associated with the artist identifier of the store content item;
    in response to the verification by the online store, associating the verified party content with the store content item; and
    displaying, based on the association between the verified party content and the store content item, the verified party content and the indication that the verified party content is from a verified party in a second portion of the graphical user interface on the device while displaying the store content item in the first portion of the graphical user interface.

2. The method of claim 1, wherein the store content item is associated with first digital rights management restrictions, and the verified party content being associated with verified party content access restrictions, the first digital rights management restrictions being different that verified party content access restrictions.

3. The method of claim 1, wherein the first portion of the graphical user interface displays the store content item that is currently being presented by the device.

4. The method of claim 3, wherein the graphical user interface is a lock screen of the device.

5. The method of claim 1, wherein the first portion of the graphical user interface displays the store content item that is available for consumption from the online store.

6. The method of claim 1, wherein the first portion of the graphical user interface displays an artist page from the online store.

7. The method of claim 1, wherein the first portion of the graphical user interface displays content in a personal media library associated with an account linked to the device.

8. The method of claim 7, further comprising:
    after receiving a request to add the verified party content to the personal media library, displaying an updated first portion of the graphical user interface that includes the verified party content, and
    displaying an updated second portion of the graphical user interface that no longer includes the verified party content that was requested to be added to the personal media library.

9. The method of claim 1, wherein the party verified by the online store to be associated with the artist identifier is associated with a verified party identifier, the verified party identifier is mapped to artist identifiers to which the verified party is associated.

10. A system comprising:
    a content repository including a plurality of store content items offered from an online store;

a processor; and
a network interface for connecting with a verified party device and a client device via one or more networks, wherein the processor is configured to execute instructions causing the processor to:
receive, from the client device, a request for a store content item, of the plurality of store content items, in the content repository, the store content item associated with an artist identifier;
retrieve, from the content repository, verified party content having a verified party content access identifier mapped to the artist identifier associated with the store content item, wherein a verified party is verified by the online store to be a party associated with the artist identifier; and
deliver the retrieved verified party content to the client device along with the store content item and an indication that the verified party content is from the verified party, wherein the store content is configured for display in a first portion of a graphical user interface of the client device, and wherein the verified party content and the indication that the verified party is from the verified party are, based on the association between the verified party content and the store content item, configured for display in a second portion of the graphical user interface on the device.

11. The system of claim 10, wherein the processor is further configured to receive an authentication credential from the verified party device.

12. The system of claim 10, wherein the processor is further configured to receive a request to upload verified party content from the verified party device.

13. The system of claim 12, wherein the processor is further configured to determine that a fingerprint of the verified party content matches known content associated with the artist identifier.

14. The system of claim 10, wherein the processor is further configured to transcode the verified party content into a plurality of formats.

15. The system of claim 14, wherein the plurality of formats include formats for displaying the verified party content on an interface selected from among an artist page interface, a lock screen interface, an interface for displaying the store content item that is currently being presented by the client device, a personal media library interface, and a verified party content aggregation interface.

16. A system comprising:
a display;
a network interface for connecting with a content repository including store content items offered from an online store;
a processor configured to:
request from the content repository a store content item, the online store having a plurality of store content items from a plurality of artists, each artist being assigned an artist identifier;
display the store content item in a first portion of a graphical user interface on the display, the store content item being associated with a first artist;
receive verified party content and an indication that the verified party content is from a verified party, wherein the verified party content is verified by the online store to be a party associated with the artist identifier;
in response to the verification by the online store, associate the verified party content with the store content item; and
display, based on the association between the verified party content and the store content item, the verified party content and the indication that the verified party content is from the verified party in a second portion of the graphical user interface on the display along with the store content item in the first portion of the graphical user interface.

17. A method comprising:
receiving an authentication credential from a verified party device;
receiving a request to upload verified party content from the verified party device;
determining that a fingerprint of the verified party content matches known content associated with an artist identifier;
generating a verified party content access identifier for the verified party content;
mapping the verified party content access identifier to the artist identifier for store content;
transcoding the verified party content for delivery to a client device receiving, from a client device, a request for a store content item associated with the artist identifier;
retrieving verified party content having a verified party content access identifier mapped to the artist identifier associated with the store content item, wherein a verified party is verified by an online store to be a party associated with the artist identifier; and
delivering the store content item along with the verified party content and an indication that the verified party content is from the verified party, wherein the store content is configured for display in a first portion of a graphical user interface of the client device, and wherein the verified party content and the indication that the verified party is from the verified party are, based on the mapping between the verified party content access identifier and the artist identifier, configured for display in a second portion of the graphical user interface on the device.

18. The method of claim 17, further comprising transcoding the verified party content into a plurality of formats for displaying the verified party content on an interface selected from among an artist page interface, a lock screen interface, an interface for displaying store content that is currently being presented by the client device, a personal media library interface, and a verified party content aggregation interface.

19. A non-transitory computer-readable storage medium storing instructions which, when executed by a computing device, cause the computing device to perform a method comprising:
requesting from an online store a store content item, the online store having a plurality of store content items from a plurality of artists, each artist being assigned an artist identifier;
displaying the store content item in a first portion of a graphical user interface on a device, the store content item being associated with a first artist;
receiving verified party content and an indication that the verified party content is from a verified party, wherein the verified party is verified by the online store to be a party associated with the artist identifier;

in response to the verification by the online store, associating the verified party content with the store content item; and displaying, based on the association between the verified party content and the store content item, the verified party content and the indication that the verified party content is from the verified party in a second portion of the graphical user interface on the device along with the store content item in the first portion of the graphical user interface.

20. A non-transitory computer-readable storage medium storing instructions which, when executed by a computing device, cause the computing device to perform a method comprising:

receiving an authentication credential from a verified party device;

receive a request to upload verified party content from the verified party device;

determining that a fingerprint of the verified party content matches known content associated with an artist identifier;

generating a verified party content access identifier for the verified party content;

mapping the verified party content access identifier to the artist identifier for store content;

transcoding the verified party content for delivery to a client device receiving, from a client device, a request for a store content item associated with the artist identifier;

retrieving verified party content having a verified party content access identifier mapped to the artist identifier associated with the store content item, wherein a verified party is verified by an online store to be a party associated with the artist identifier; and delivering the store content item along with the verified party content and an indication that the verified party content is from the verified party, wherein the store content item is configured for display in a first portion of a graphical user interface of the client device, and wherein the verified party content and the indication that the verified party is from the verified party are, based on the mapping between the verified party content access identifier and the artist identifier, configured for display in a second portion of the graphical user interface on the device.

21. The method of claim 1, wherein a verified party identifier of the verified party is verified by the online store to be associated with the artist identifier of the store content item, and wherein the verified party identifier is different from the artist identifier.

22. The system of claim 10, wherein the verified party is verified by the online store based on a verified party identifier of the verified party associated with the artist identifier of the store content item, and wherein the verified party identifier is different from the artist identifier.

23. The system of claim 16, wherein a verified party identifier of the verified party is verified by the online store to be associated with the artist identifier of the store content item, and wherein the verified party identifier is different from the artist identifier.

24. The method of claim 17, wherein the authentication credential is verified by the online store to be associated with a verified party identifier, and wherein the verified party identifier is different from the artist identifier.

25. The non-transitory computer-readable storage medium of claim 19, wherein the verified party is verified by the online store based on a verified party identifier of the verified party associated with the artist identifier of the store content item, and wherein the verified party identifier is different from the artist identifier.

26. The non-transitory computer-readable storage medium of claim 20, wherein the authentication credential is verified by the online store to be associated with a verified party identifier, and wherein the verified party identifier is different from the artist identifier.

* * * * *

UNITED STATES PATENT AND TRADEMARK OFFICE
CERTIFICATE OF CORRECTION

PATENT NO. : 11,017,444 B2
APPLICATION NO. : 14/871807
DATED : May 25, 2021
INVENTOR(S) : Alsina et al.

Page 1 of 1

It is certified that error appears in the above-identified patent and that said Letters Patent is hereby corrected as shown below:

In the Claims

Claim 10, at Column 15, Line 20, insert --item-- after "content"

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*